United States Patent [19]

Namuduri et al.

[11] Patent Number: 5,264,775
[45] Date of Patent: Nov. 23, 1993

[54] PULSE WIDTH MODULATION CONTROL APPARATUS AND METHOD

[75] Inventors: Chandra S. Namuduri, Sterling Heights; Kalyan P. Gokhale, Shelby Township, Macomb County, both of Mich.

[73] Assignee: General Motors Corporation, Detroit, Mich.

[21] Appl. No.: 756,658

[22] Filed: Sep. 9, 1991

[51] Int. Cl.⁵ .............................................. H02P 5/40
[52] U.S. Cl. .................................. 318/811; 318/807; 318/599; 363/41; 363/132
[58] Field of Search ............... 318/803, 807, 809, 811, 318/599; 388/811; 363/41–42, 132

[56] References Cited

U.S. PATENT DOCUMENTS

| | | | |
|---|---|---|---|
| 4,327,315 | 4/1985 | Kawada et al. | 318/803 |
| 4,357,655 | 11/1982 | Beck | 363/42 |
| 4,424,557 | 1/1984 | Steigerwald | 363/98 |
| 4,544,868 | 10/1985 | Murty | 318/811 |
| 4,602,201 | 7/1986 | Edwards | 318/811 |
| 4,626,763 | 12/1986 | Edwards | 363/41 |
| 4,760,316 | 7/1988 | Hedlund | 318/254 |
| 4,833,586 | 5/1989 | Inaba et al. | 318/811 |
| 4,841,207 | 6/1989 | Cheyne | 388/811 |
| 4,849,871 | 7/1989 | Wallingford | 363/132 |

OTHER PUBLICATIONS

Paper entitled "Four-Quadrant Sensorless Brushless ECM Drive", Becerra et al, Conference Record of 6th Annual Applied Power Electronics Conference, CH2992-6/91/0000-0202, pp. 202-209, May 1991.

Primary Examiner—William M. Shoop, Jr.
Assistant Examiner—John W. Cabeca
Attorney, Agent, or Firm—Mark A. Navarre

[57] ABSTRACT

A controller for a multi-phase brushless DC motor which pulse width modulates the switching devices of a bridge controller, thereby energizing the phase windings of the motor in such a manner as to eliminate current flow in the inactive phase windings. The bridge switching devices are modulated over distinct segments of the total conduction time. A pattern of modulation, constant conduction, and modulation is established which allows circulating current to flow only through active phase windings, effectively eliminating any undesirable braking torque resulting from current flow through inactive phase windings which lowers the overall motor efficiency.

5 Claims, 4 Drawing Sheets

PULSE WIDTH MODULATION CONTROL APPARATUS AND METHOD

This invention relates to an apparatus and method of pulse width modulating the switching devices of a full wave bridge inverter for a three-phase brushless DC motor which increases the overall torque output of the motor by restricting the flow of circulating currents to predetermined phase windings in order to not cause unwanted braking torque.

BACKGROUND OF THE INVENTION

In a multi-phase brushless DC motor, the rotary field is established by a set of permanent magnets secured to the rotor, and the stationary field is established by sequentially energizing a set of phase windings secured on the stator. A position or back-EMF sensing device detects the position of the rotor and a logic circuit energizes the appropriate stator windings via a pair of bridge inverter switching devices relative to the detected position of the rotor to accelerate the rotor.

There are two distinct purposes for controlling the conduction of the switching devices of a bridge inverter. One purpose is to apply a specific polarity of current to a specific phase winding based on a given rotor magnet position with respect to the phase windings in order to cause the rotor to rotate in a desired direction. This switching, called commutation, occurs at a frequency generally referred to as the electrical frequency of the motor. The second purpose for controlling the conduction of the switching devices of a bridge controller is to regulate the energization current applied to the phase windings by repeatedly applying and removing a constant DC voltage source to the phase windings. By varying the energization current, the speed of the rotor may be varied at some speed less than that at which the rotor would turn if the supply voltage were fully applied to the phase windings. This switching is called pulse width modulation (PWM) switching and occurs at a much higher frequency than the electrical frequency of the motor.

For a brushless DC motor having a trapezoidal back-EMF waveform, the desired phase current waveforms are 120 electrical degree wide current pulses which are of the same polarity and in phase with the flat (constant) portion of the trapezoidal back-EMF waveforms. Thus, for any rotor position, it is desired that only two phases carry current and that the third phase carries zero current. Phases which carry current are referred to as active phases, and phases which do not carry current are referred to as inactive phases. When operating such a variable speed brushless DC motor, both electrical commutation and PWM switching take place concurrently. During the ON period of the PWM switching, the entire DC source voltage is applied across the two active phases to build up the current. During the OFF period of the PWM switching, the active phase current continues to circulate in the active phase windings. Under certain conditions, however, a pulse of current also can flow in the inactive phase winding with a polarity opposite that of the back-EMF, producing a negative or braking torque in the so-called inactive phase. This current flow is undesirable because braking torque lowers the average torque of the motor for a given energization current, making the motor less efficient.

SUMMARY OF THE PRESENT INVENTION

The present invention is directed to an improved apparatus and method of PWM control for a multiphase brushless DC motor where the switching devices of a full wave bridge inverter are pulse width modulated to eliminate the flow of braking current through the inactive phase winding. By modulating the switching devices in a predetermined manner, current flow in inactive phase windings can be eliminated, eliminating braking torque and increasing motor efficiency.

While two switching devices of the inverter must be conducting in order to energize the phase windings, only one switching device need be pulse width modulated for current control. Because only one of the two switching devices need be modulated, a pattern of modulating the conducting switches for only a segment of their overall conduction period may be established which restricts current flow to only active phase windings. This invention accomplishes this by modulating a switching device for 60 of the 120 electrical degrees overall conduction period, the switching device remaining ON continuously for the remaining 60 electrical degrees. The 60 electrical degrees of modulation are further divided into one initial and one final 30 electrical degree portion of the 120 electrical degree conduction period. The initial and final portions occur, respectively, before and after the intermediate 60 electrical degree continuously ON period. Thus, the switching device is modulated in a 30-60-30 electrical degree pattern of modulation—continuous conduction—modulation. Furthermore, by modulating the switching device in this manner, other advantages are realized, including lower current ripple in the conducting phase windings and an even distribution of switching losses.

DETAILED DESCRIPTION OF THE INVENTION

Figure 1:
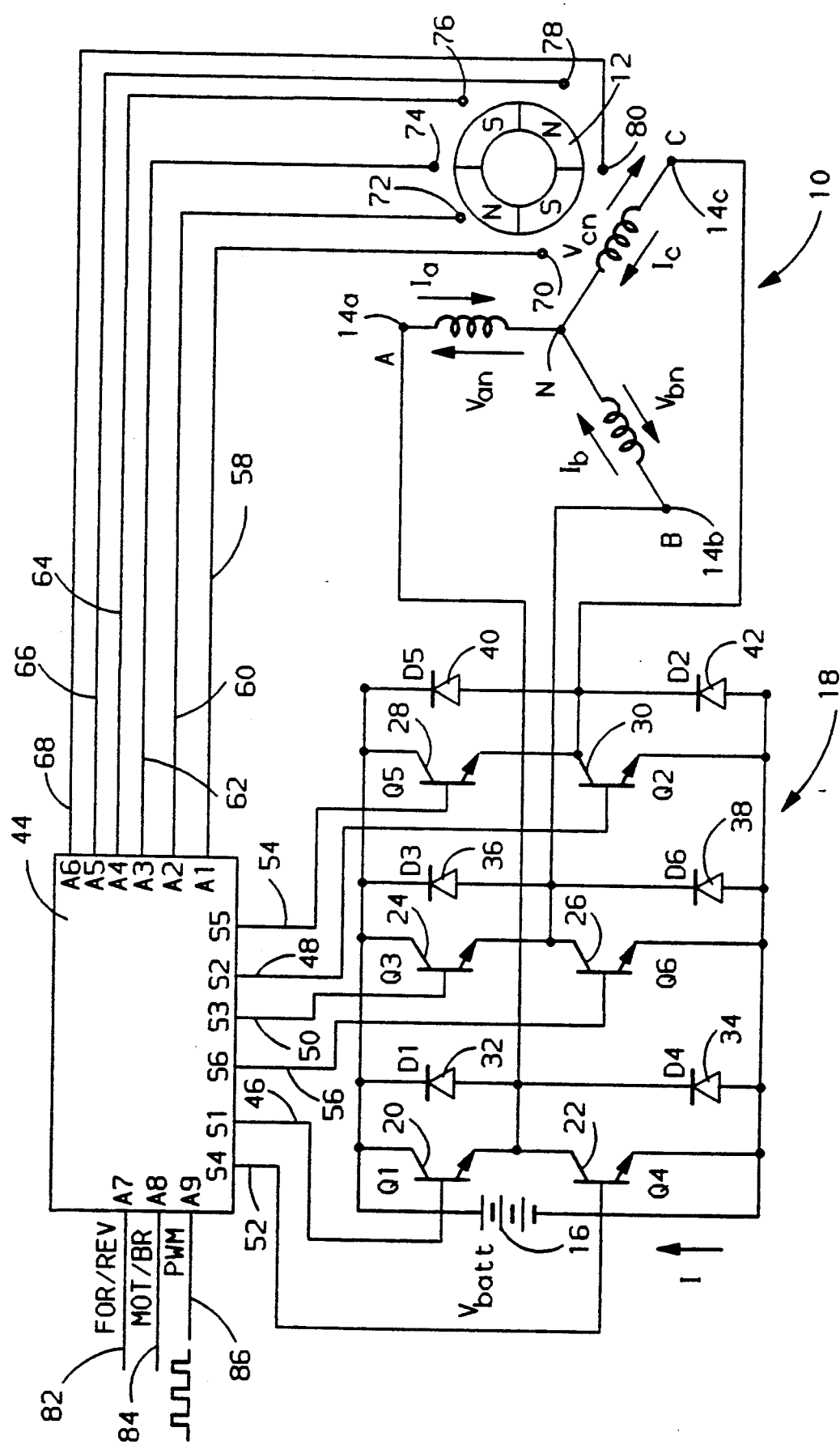
FIG. 1 is a block diagram of a three-phase brushless DC motor drive including a full wave bridge inverter circuit and the controller of this invention.

Referring first to FIG. 1, the reference numeral 10 generally designates a brushless DC motor system comprising a permanent magnet rotor 12 and three stator windings 14a, 14b and 14c. The stator windings 14a, 14b and 14c are mutually connected at one end to a common terminal N in a wye-configuration and individually connected at their other ends to the storage battery 16 via upper and lower transistors of a full wave bridge circuit 18. Thus, the winding 14a, is connected to the battery 16 via the upper and lower bridge transistors Q1 and Q4; the winding 14b is connected to the battery via the upper and lower bridge transistors Q3 and Q6; and the winding 14c is connected to the battery 16 via the upper and lower bridge transistors Q5 and Q2. The freewheeling diodes 32, 34, 36, 38, 40 and 42 (also referred to as D1, D4, D3, D6, D5 and D2, respectively) are connected across the emitter-collector circuits of the bridge transistors Q1, Q4, Q3, Q6, Q5 and Q2, respectively, for circulating inductive energy of the respective stator windings.

Bridge transistors Q1, Q2, Q3, Q4, Q5 and Q6 are controlled through data outputs S1-S6 and lines 46, 48, 50, 52, 54, and 56, respectively, by controller 44 which could be an read-only memory or some other form of programmable logic. For a three phase brushless DC motor not using PWM control, data outputs S1, S2, S3, S4, S5 and S6 operate sequentially to turn on their respective bridge transistors so that transistors Q1–Q6 turn ON sequentially every 60 electrical degrees. Each transistor will turn ON for 120 electrical degrees then turn OFF for 240 electrical degrees to cover the entire 360 electrical degrees of rotation, see FIG. 2. In order to effectuate current control through pulse width modulating the bridge transistors in a conventional PWM apparatus, a transistor is repeatedly switched ON and OFF during the 120 electrical degree conduction period. The frequency at which the transistor is modulated is much higher than the electrical frequency of the machine.

The logic level present at data outputs S1-S6 of controller 44, and hence, the motor winding energization pattern, is controlled as a function of the logic level of the control address inputs A1-A9. Address inputs A1, A2, A3, A4, A5, and A6 are obtained directly via lines 58, 60, 62, 64, 66, and 68 from the sensors 70, 72, 74, 76, 78, and 80. The sensors 70, 72, 74, 76, 78, and 80 are situated to provide an indication of the rotor position at a 30 electrical degree resolution. In the illustrated embodiment, the sensors 70, 72, 74, 76, 78, and 80 are of the Hall effect type; however, other sensor configurations that also provide 30 electrical degrees of resolution would be equally acceptable.

In the illustrated embodiment, address inputs A7 and A8 of the controller 44 are externally generated. In such a system, the motor 10 is coupled to an external apparatus upon which the motor effectuates some manner of control depending on the apparatus. On line 82 a forward/reverse signal is generated for control address input A7 to designate the desired direction of motor rotation. Address input A8 receives a signal on line 84 which designates either motor rotation or motor braking.

Address input A9 receives a switch control signal on line 86 developed from an external pulse width modulator (not shown). During the period of electrical rotation in which any of bridge transistors 20, 22, 24, 26, 28 and 30 are modulated, this switch control signal determines the ON and OFF times for modulation of that bridge transistor. The pulse width modulator generates a switch control signal, input to address input A9, based on the comparison of the reference (desired) phase current with the actual (measured) phase current. If the actual phase current is less than the reference value by a specified amount, the switch control signal (address input A9) goes logically high, indicating that the modulated bridge transistor should be ON. If the actual phase current is more that the reference value by a specified amount, the switch control signal (address input A9) goes logically low, indicating that the modulated bridge transistor should be OFF. Such a PWM method of phase current control is called bang-bang or hysteretic control.

Referring particularly to controller 44 in this embodiment, it is a read-only memory which generates a control word based on the state of address inputs A1-A9, which are either logic high or logic low. Address inputs A1-A6 identify one of twelve positions of the rotor 12 based on a required 30 electrical degree resolution over 360 electrical degrees. Address input A7 identifies the desired direction of rotation of the motor, forward or reverse. Address input A8 identifies the mode of operation, rotation or braking. Address input A9 identifies the current state of the PWM switch control signal, on or off. The combination of twelve rotor positions, two rotational directions, two operating modes, and two modes of PWM identifies 96 possible bridge transistor activation configurations. The states of data outputs S1-S6 are stored as a memory word of at least 6 bits each bit of which corresponds to one of data outputs S1-S6. A logic high on a data line turns ON its respective bridge transistor, and a logic low on a data line turns OFF its respective bridge transistor. Because the state of each bridge transistor Q1-Q6 can be predetermined according to rotor position, direction of rotation, operating mode, and the PWM command, the contents of the address location designated by address inputs A1-A9 are the bridge transistor activation states for that particular condition. When one address input A1-A9 changes, a different word in memory is output on S1-S6, changing the state of the bridge inverter transistors appropriately.

Since two bridge transistors are always conductive, six different stator winding energization patterns are possible, such patterns being designated as AC, AB, CA, CB, BA and BC. The first designation letter refers to the stator winding (14a, 14b or 14c) connected through a bridge transistor to the positive terminal of storage battery 16, and the second letter designation refers to a stator winding connected through a bridge transistor to the negative (grounded) terminal of storage battery 16. Each stator winding energization pattern produces a distinct stator magnetic field, and the conduction of the various bridge transistors is controlled by controller 44 and the rotor position sensors 70, 72, 74, 76, 78, and 80 such that the magnetic axis of the stator maintains a predetermined relationship with respect to the magnetic axis of the rotor 12.

Figure 2:
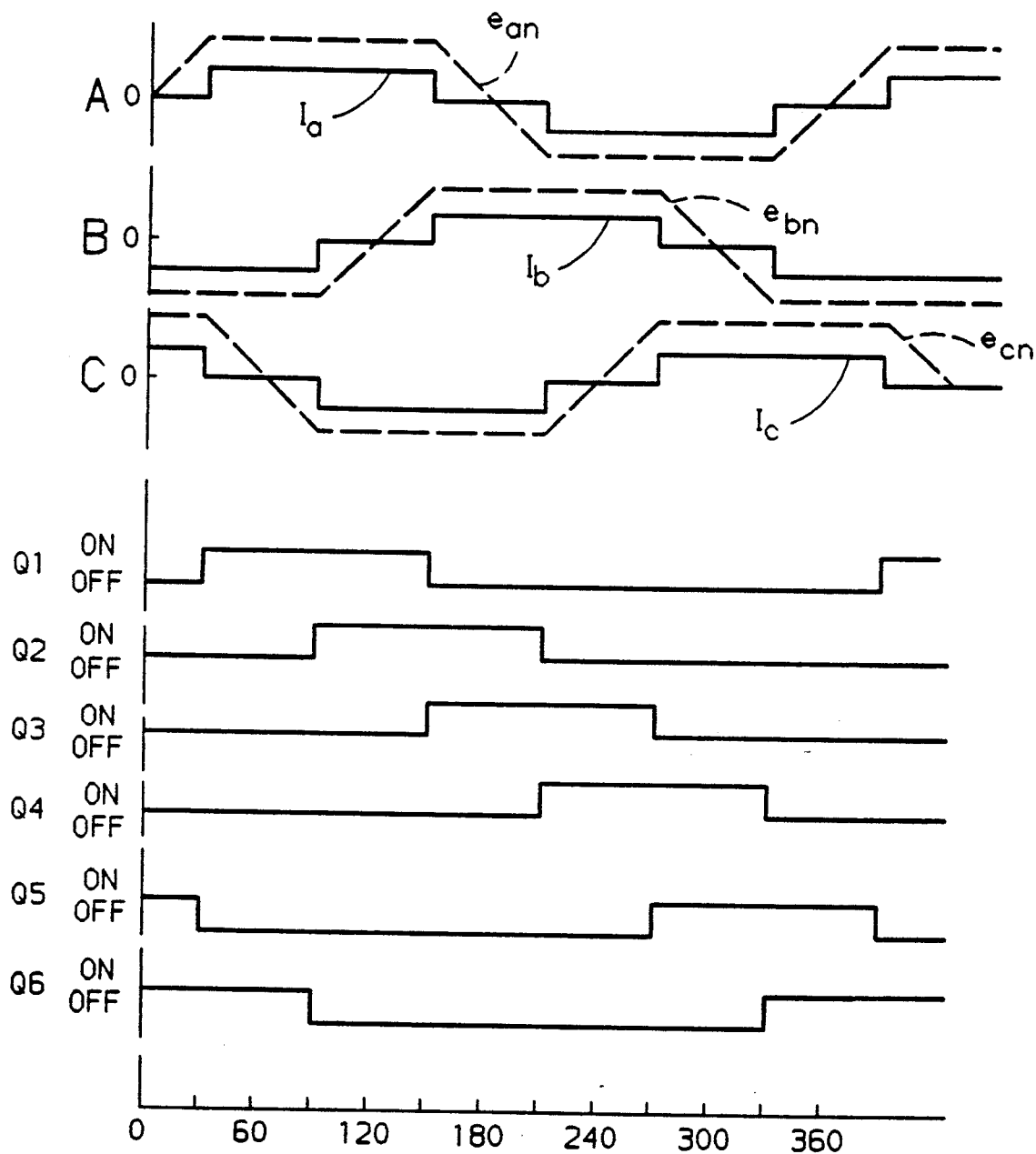
FIG. 2 depicts the back-EMF and current waveforms for the motor phase windings and the commutation switching of the full wave bridge inverter circuit of FIG. 1.

The information for maintaining this sequence of phase winding activation is obtained from the rotor position sensors 70, 72, 74, 76, 78, and 80 which, due to their orientation with respect to the rotor magnetic field, indicate twelve distinct regions of rotor position. If the forward direction of motor rotation is defined as being clockwise, the correct stator winding energization sequence pattern is AC, BC, BA, CA, CB and AB. Each such stator winding energization pattern is maintained for 60 electrical degrees of rotor rotation as indicated in FIG. 2, and together the patterns occupy 360 electrical degrees or one complete cycle. Note that in order to obtain 60 electrical degrees of resolution, only three equally spaced position sensors are required; six sensors are necessary in this invention to yield the required resolution and enable pulse width modulation as described herein.

The desired energization sequence explains why the freewheeling diodes D1-D6, the bridge transistors Q1-Q6 and the lines from the controller 44 to the bridge transistors S1-S6 are numbered as they are. The energization sequence is obtained by switching on the respective transistors Q1, Q2, Q3, Q4, Q5 and Q6 in numerical sequence each for 120 electrical degrees. Reverse motor rotation is obtained by providing the opposite stator winding energization pattern for a given rotor position. Thus, the stator winding energization pattern sequence for reverse motor rotation is CA, BA, BC, AC, AB and CB.

FIG. 2 depicts the relationship between the bridge transistor states to the phase winding currents and back-EMF voltages through 360 degrees of electrical rotation when the bridge transistors are not pulse width modulated. Note that here the bridge transistors are ON continuously. From FIG. 2 it can be seen that the currents in any particular winding are in phase with the back-EMF voltages for a constant back-EMF. A conventional method of PWM generates similar back-EMF and current waveforms as shown in FIG. 2, except an undesirable current of opposite polarity than the back-EMF appears in the non-conducting phase as described below in reference to FIGS. 4-6. This current causes a braking torque which decreases the overall torque output of the motor.

Figure 3:
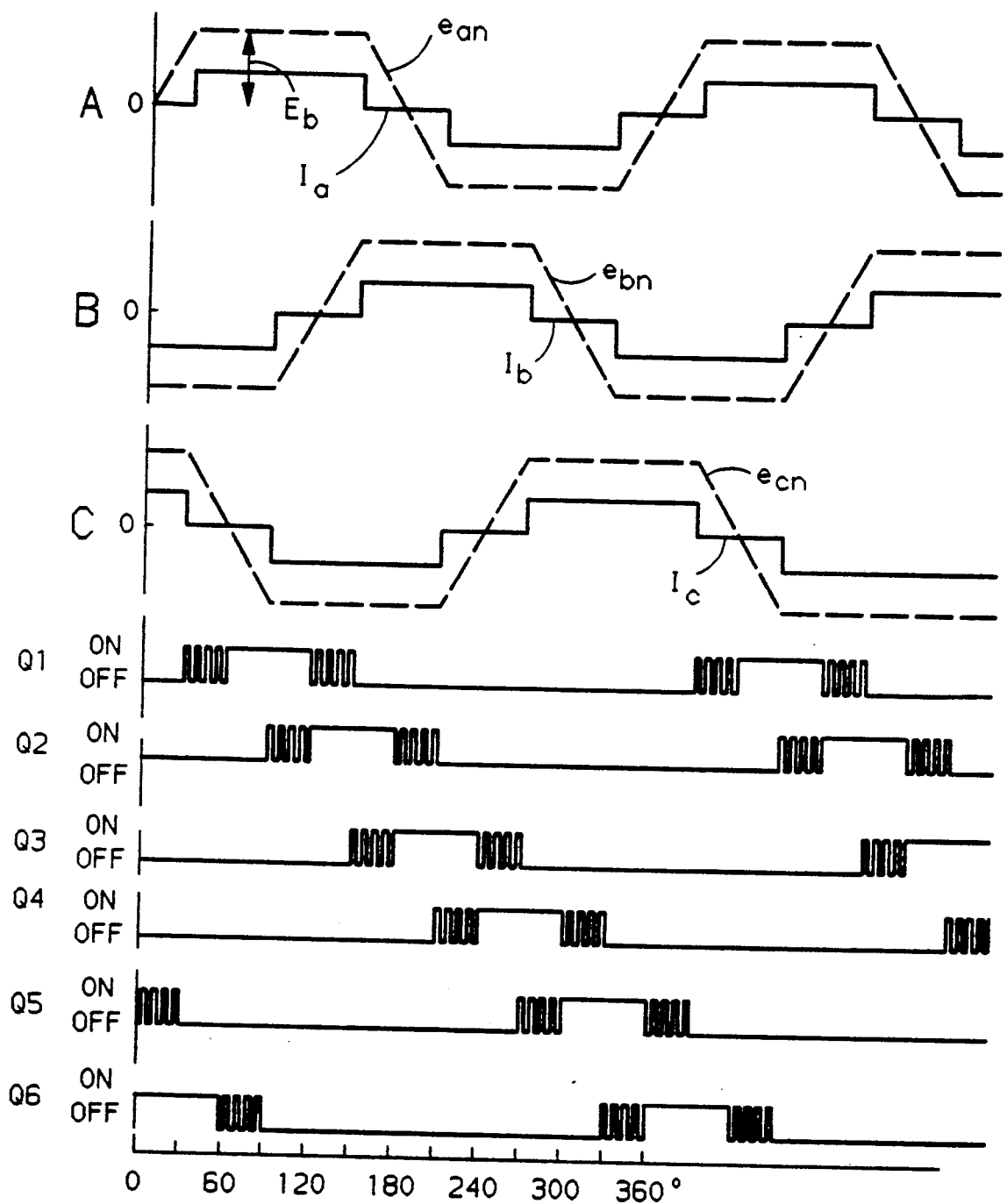
FIG. 3 depicts the back-EMF, current waveforms, and the switching states of the switching devices for the inverter circuit of FIG. 1 according to this invention.

Referring particularly to the energization pattern of this invention, when a bridge transistor is pulse width modulated to effectuate phase winding current control, it is modulated for only segments of its entire conduction state. This modulation scheme divides the 120 electrical degrees of conduction time of each transistor into three separate segments of 30, 60 and 30 electrical degrees. A bridge transistor is pulse width modulated during the two 30 degree segments and is ON continuously during the 60 degree segment. Because a pair of bridge transistors must be on to energize the phase windings, when one bridge transistor is on continuously, the other bridge transistor will be modulated, maintaining pulse width modulation of the applied current. This creates a symmetric 30-60-30 degree pattern of modulation—continuous conduction—modulation. FIG. 3 shows the states of the bridge transistors, and the resulting back-EMF and current waveforms for each phase winding over 360 electrical degrees that result when such a method of PWM as described herein is implemented.

While the primary advantage of this scheme is to increase overall motor torque, additional benefits are realized by pulse width modulating only one bridge transistor at any given time. These benefits include: (1) reduced current ripple in the conducting phase windings because only one bridge transistor is modulated while the other remains in the ON state, and (2) uniform switching loss distribution due to equal amounts of conduction and switching time for each bridge transistor.

This invention takes advantage of the known phase winding current and back-EMF characteristics of a brushless, three-phase DC motor, as depicted in FIG. 2, when pulse width modulating the switching elements. An analysis of the resulting circuits when the modulated transistor turns OFF determines whether the freewheeling diodes of the inactive phase will be forward or reverse biased. If both diodes are reverse biased, no current will flow in the inactive phase and no braking torque will be generated. If a diode in the inactive phase is forward biased, the inactive phase is conducting current which generates a braking torque.

Referring to FIG. 3, starting at 30 electrical degrees, bridge transistor Q1 is modulated, but rather than modulating Q1 for 60 or 120 electrical degrees, it is only modulated for 30 electrical degrees of rotation. At 60 electrical degrees, Q1 is no longer modulated, but remains ON. However, at 60 electrical degrees, bridge transistor Q6 is in its last 30 of its overall 120 electrical degrees ON state so that pulse width modulation of the phase winding current is maintained, but via bridge transistor Q6. At 90 electrical degrees, Q1 continues operation in a non-modulated state and bridge transistor Q2 commences operation. Because Q2 is in its first 30 electrical degrees, it will be modulated, continuing to regulate the the phase winding current. At 120 electrical degrees, Q2 operates in a non-modulated state, but Q1 returns to operation in a modulated state because it is in its final 30 electrical degrees of its overall ON state.

Pulse width modulating the bridge transistors in this manner increases the output torque by preventing current from circulating through a phase winding that should not be active at that time. Restricting current flow to the two active phase windings reduces any braking torques produced and, consequently, increases the output torque of the machine.

Figure 4:
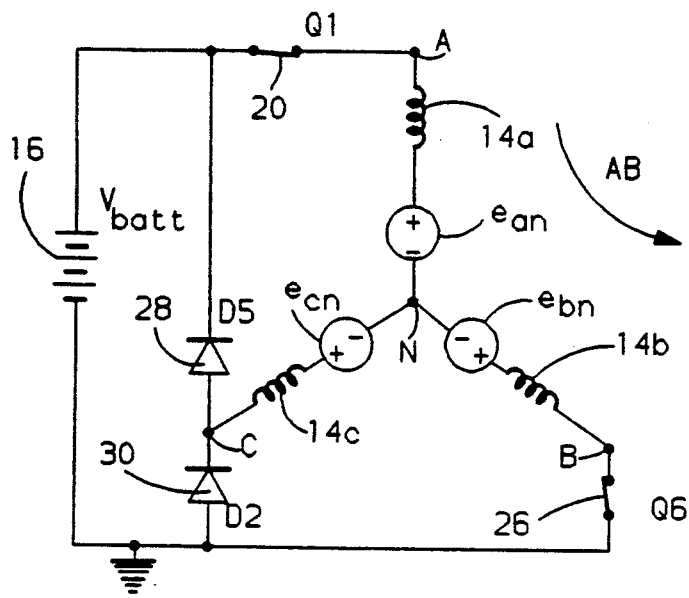
FIGS. 4, 5 and 6 are equivalent circuit diagrams of the circuits that result from pulse width modulating different bridge transistors.
Figure 5:
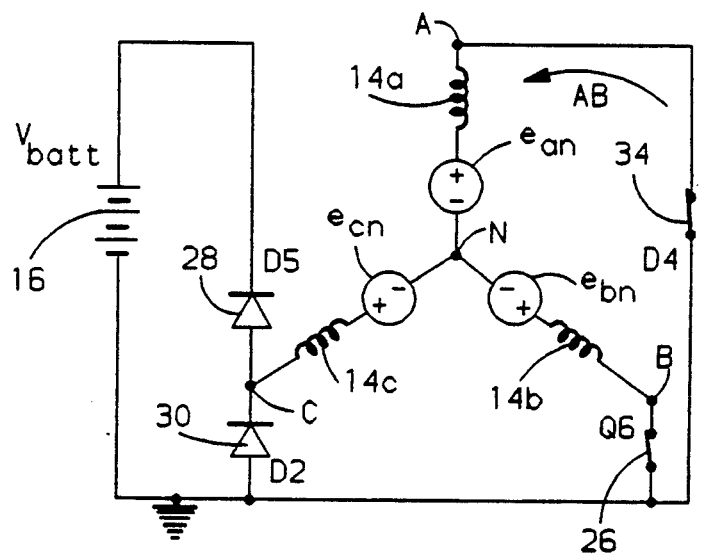
Figure 6:
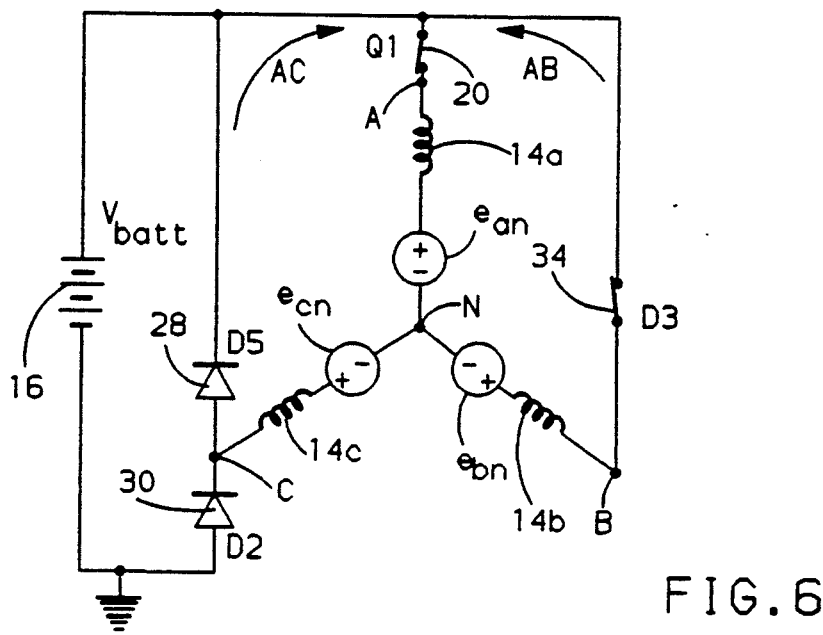

Examining how braking torque is minimized and output torque increased requires an analysis of the resulting circuits during the different modes of PWM. The equivalent circuit of FIG. 4 represents the situation where both switch elements are ON during the 30 to 60 electrical degree interval. The circuits of FIGS. 5 and 6 are the equivalent circuits that are alternatives to each other which may result depending on whether Q1 or Q6 is pulse width modulated over the 30 to 60 electrical degree range. If Q6 is pulse width modulated, the equivalent circuit of FIG. 5 results, and if Q1 is pulse width modulated, the equivalent circuit of FIG. 6 results.

Note that the stator windings are represented as having an inductance and a back-EMF $e_{an}$, $e_{bn}$, and $e_{cn}$. Such a representation also includes a resistance which reflects the resistance of the windings (not shown). The circuits to be analyzed hereinafter are the equivalent circuits that result when the motor is between 30 and 60 electrical degrees. Referring to FIG. 3 over this range, bridge transistor Q6 is ON continuously, and bridge transistor Q1 is in PWM mode. The peak value of the back-EMF is $E_b$. Thus, $e_{an} = -e_{bn} = E_b$, and $0 < = e_{cn} < = E_b$. The current flowing in the motor is current AB. It should also be noted that because the drive is operated at speeds below the rated speed, $2E_b < V_{batt}$.

FIG. 4 depicts the resulting circuit when both transistors Q1 and Q6 are ON, that is, the bridge transistor being modulated is currently ON as well as the continuously conducting, non-modulated transistor. The current flowing in the motor is current AB. The state of diodes D2 and D5 must be resolved to determine whether there is current flowing in phase C. The voltage at point C will dictate whether either D2 or D5 are ON. The voltage at point C is the sum of the voltage at point N added to the voltage difference between points C and N. The voltage at point N is $V_{batt}/2$, by divider action, and the voltage between points C and N is $e_{cn}$. For example, at 45 electrical degrees, $e_{cn} = E_b/2$, and the voltage at point C is $V_c = (V_{batt} + E_b)/2$. Thus, at 45 electrical degrees, D2 is off because $V_c > 0v$, and D5 is off because $V_c < V_{batt}$. Accordingly, there is no circulating current in phase C.

Temporarily disregarding any effect with respect to braking torque, it is necessary to pulse width modulate only one of the bridge transistors, either Q1 or Q6, in the range of 30 to 60 electrical degrees in order to effectuate only current control. However, to attain proper current control and an increase in the overall motor torque output, an analysis must be made as to whether modulating one bridge transistor as compared to the other will restrict the current flow only to the active phases. The analysis essentially determines if modulating one of the pair of active bridge transistors forward biases either of the diodes in the inactive phase of the motor. The forward biasing of either diode in the inactive phase is undesirable because current would flow in the inactive phase, and modulation of the bridge transistor that resulted in this condition should be avoided. Analyzing the equivalent circuits of FIGS. 5 and 6 in the same way that FIG. 4 was analyzed will determine which ON transistor should be modulated over this period.

If bridge transistor Q1 is pulse width modulated, when it turns OFF, the resulting circuit is shown in FIG. 5. A circulating current AB now flows through Q6 and freewheeling diode D4. Turning to phase winding C, it is necessary to determine the voltage level at point C and whether freewheeling diodes D5 or D2 are conducting current. As explained above, the voltage at point C is the sum of the voltage at point N added to the voltage difference between points C and N. The voltage at point N equals zero volts. The voltage between points C and N is the back-EMF generated in phase winding C. For example, at 45 electrical degrees, $e_{cn} = E_b/2$, and the voltage at point C is $V_c = 0v + E_b/2$. Thus, at 45 electrical degrees, D2 is off because $V_c > 0v$, and D5 is off because $V_c < V_{batt}$. Accordingly, there is no circulating current in phase C. Phase C conducts no current and does not generate any braking torque.

Using the possible alternative of pulse width modulating the other conducting bridge transistor, Q6, yields different conclusions. If Q6 turns OFF and Q1 remains ON, the equivalent circuit is depicted in FIG. 6. Since bridge transistor Q1 remains ON, the circulating current AB now flows through freewheeling diode D3. Once again it is necessary to look at the voltage at point C to determine whether freewheeling diodes D5 or D2 are conducting current. The voltage at point C is the sum of the voltage at point N added to the voltage difference between points C and N. The voltage at point N is $V_{batt}$. For example, again referring to 45 electrical degrees, the voltage between points C and N is the back-EMF generated in phase winding C, $E_b/2$. Thus, the voltage at point C is $V_c = V_{batt} + E_b/2$. At 45 electrical degrees, D2 is off because $V_c > 0v$; however, D5 is on because $V_c > V_{batt}$. Accordingly, there is a current flow out of phase C in the same direction as the back-EMF. This current flow in phase C generates a braking torque and decreases the overall torque output of the motor.

The above analysis shows that from 30 to 60 electrical degrees Q1, not Q6, should be modulated. A similar analysis over the entire range of rotor rotation will indicate that a 30-60-30 pattern of modulation—continuous conduction—modulation for each bridge transistor eliminates the circulating current flow in the inactive phase winding. FIG. 3 depicts the resulting switching pattern for the bridge transistors which will automatically result in the elimination of circulating current in the inactive phase winding.

While this invention has been described in reference to the illustrated embodiments, it will be understood that the scope of the present invention is not limited thereto. Various modifications to the illustrated embodiment may occur to those skilled in the art, and it should be understood that systems incorporating such modifications may also fall within the scope of this invention, which is defined by the appended claims.

The embodiments of the invention in which an exclusive property or privilege is claimed are defined as follows:

1. In a brushless motor drive arrangement including a set of three wye-connected motor phase windings energized from a DC source via the switching devices of a bridge inverter, each phase winding being connected to positive and negative DC source terminals through a pair of switching devices of said inverter, the switching devices being activated in conduction periods to sequentially energize predefined pairs of phase windings with current from said source in relation to the position of a motor rotor, a method of modulating the switching devices, comprising the steps of:

defining a modulation signal based on a comparison of the phase winding current with a reference current;

defining an off period of modulation as a period of said modulation signal during which a modulated switching device is not activated; and modulating the activation of each switching device with said modulation signal during initial and final portions of its respective conduction period while maintaining continuous activation of said switching device during a portion of the conduction period intermediate to said initial and final periods so that current circulating through said phase windings during off periods of said modulation signal is restricted to the energized pair of phase windings.

2. The method set forth in claim 1, wherein:

said initial portion of the conduction period of the switching devices occurs substantially during a first quarter of said conduction period;

said intermediate portion of the conduction period of the switching devices occurs substantially during second and third quarters of said conduction period; and said final portion of its respective conduction period occurs substantially during a fourth quarter of said conduction period.

3. A motor control apparatus for a brushless DC motor comprising:

a set of three wye-connected motor phase windings energized from a DC source via the switching devices of a bridge inverter where each phase winding is connected to positive and negative DC source terminals through a pair of switching devices of said inverter;

control means for activating the switching devices in conduction periods to sequentially energize predefined pairs of phase windings with current from said DC source in relation to the position of a motor rotor to define a conduction period;

means for defining a modulation signal, where the modulation signal includes an on period during which the switching device are to be activated and an off period during which the switching device are to be deactivated; and means for modulating the conduction period of each switching device with the modulation signal during first and third predefined portions of said conduction period while maintaining continuous activation of said switching device during a second predefined portion of the conduction period intermediate to said first and third periods so that current circulating through said phase windings during off periods of said modulation signal is restricted to the energized pair of phase windings.

4. The apparatus set forth in claim 3, wherein:
said first predefined portion occupies substantially a first quarter of said conduction period;
said second predefined portion occupies substantially second and third quarters of said conduction period; and
said third predetermined portion occupies substantially a fourth quarter of said conduction period.

5. In a brushless motor drive arrangement including a set of three wye-connected motor phase windings energized from a DC source via the switching devices of a bridge inverter, each phase winding being connected to positive and negative DC source terminals through a pair of switching devices of said inverter, the switching devices being activated in 120 electrical degree conduction periods to sequentially energize predefined pairs of phase windings with current from said source in relation to the position of a motor rotor, a method of modulating the switching devices, comprising the steps of:
defining a modulation signal based on a comparison of the phase winding current with a reference current;
defining an off period of modulation as a period of said modulation signal during which a modulated switching device is not activated; and
modulating said conduction period of each switching device with said modulation signal substantially during initial and final 30 electrical degree portions of its respective 120 electrical degree conduction period while maintaining continuous activation of said switching device substantially during 60 electrical degrees intermediate to said initial and final 30 electrical degree portions of modulation.

* * * * *